Feb. 23, 1937.  L. C. SHIPPY  2,071,584
MACHINE FOR FORMING RADIATOR STRIPS
Filed Jan. 25, 1935   5 Sheets-Sheet 3

Inventor
Leo C. Shippy

Feb. 23, 1937. L. C. SHIPPY 2,071,584
MACHINE FOR FORMING RADIATOR STRIPS
Filed Jan. 25, 1935 5 Sheets-Sheet 5

Leo C. Shippy, Inventor

By Blackmore, Spencer & Flint
Attorneys

Patented Feb. 23, 1937

2,071,584

UNITED STATES PATENT OFFICE 2,071,584

MACHINE FOR FORMING RADIATOR STRIPS

Leo C. Shippy, Lockport, N. Y., assignor to General Motors Corporation, Detroit, Mich., a corporation of Delaware Application January 25, 1935, Serial No. 3,426

8 Claims. (Cl. 153—2)

This invention relates to automatic machines for shaping thin metallic ribbon and cutting the formed strip to given size. The machine was designed especially for the manufacture of strips used in the cellular type automobile radiator core. The ordinary core comprises a series of preformed strips stacked side by side to afford a series of spaced water tubes with fins therebetween. The strips usually carry a regular succession of zigzag or other similar formations and for quantity production are formed by feeding ribbon stock between roll dies and then cutting the formed stock to proper length. A machine of this character is illustrated for example in Harrison Patent 1,212,482 and the present invention is an improvement thereover.

Essentially the improvement lies in the mechanism whereby the length of formed strip cut off is more accurately controlled and a cleaner cut insured. In machines heretofore used the knife operates periodically in the cycle of operation on a continuously moving strip and so long as the formations in the strip are such as to give it longitudinal stiffness no serious difficulty is encountered in shearing to size. However, without longitudinal stiffness, as is the case with a deeply corrugated or accordion pleated strip which is prone to expand or contract longitudinally, it is impossible, because of the flimsiness and the tendency of the pleats to crowd together or spread apart, to sever the strip accurately in predetermined lengths and on straight lines. Accordingly, it is proposed to incorporate in the machine, as a part of its automatic operating mechanism, an index device associated with the shearing knife for locating the ribbon and moving forward a given amount between successive cutting strokes in timed relation with the forming roll output.

The invention further contemplates the provision of an improved drive for the cooperative action and intermittent operation of the knife and indexing mechanism.

Figure 1:
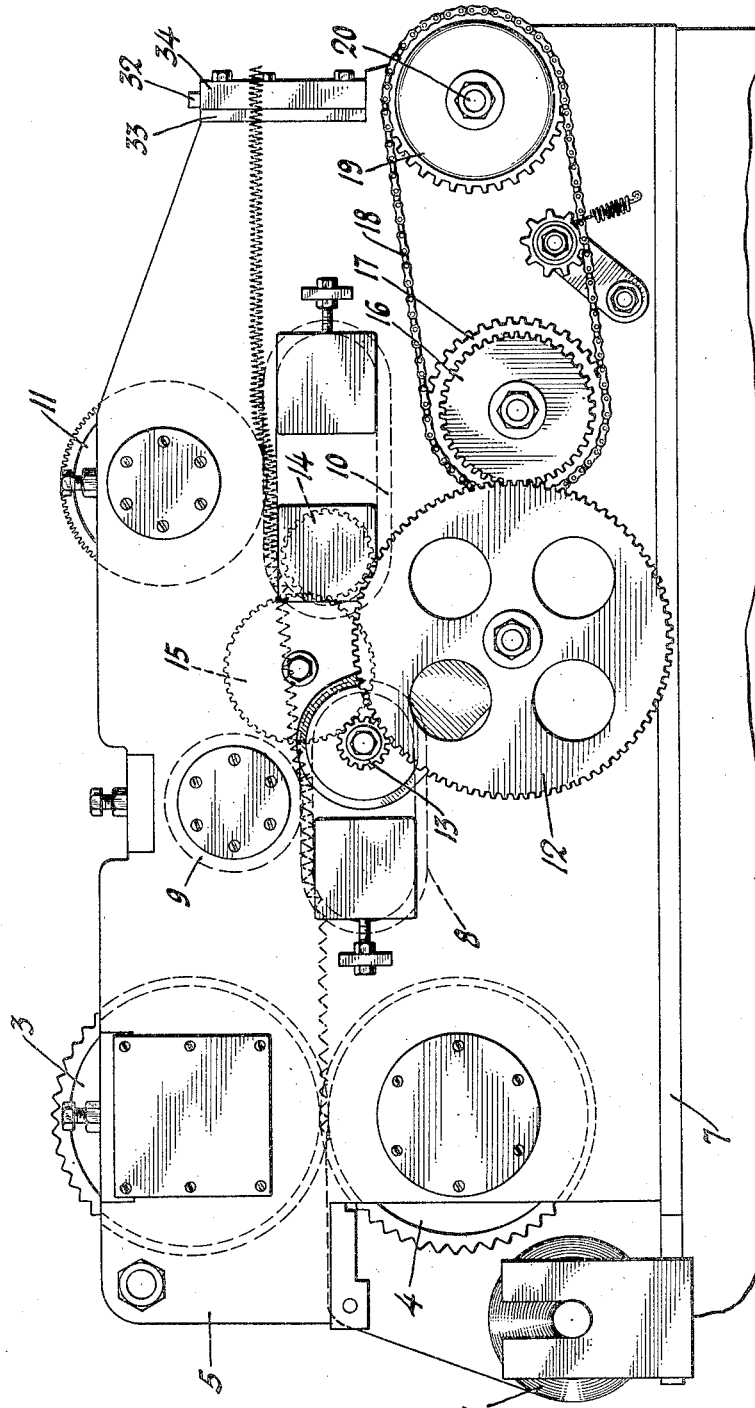
Figure 2:
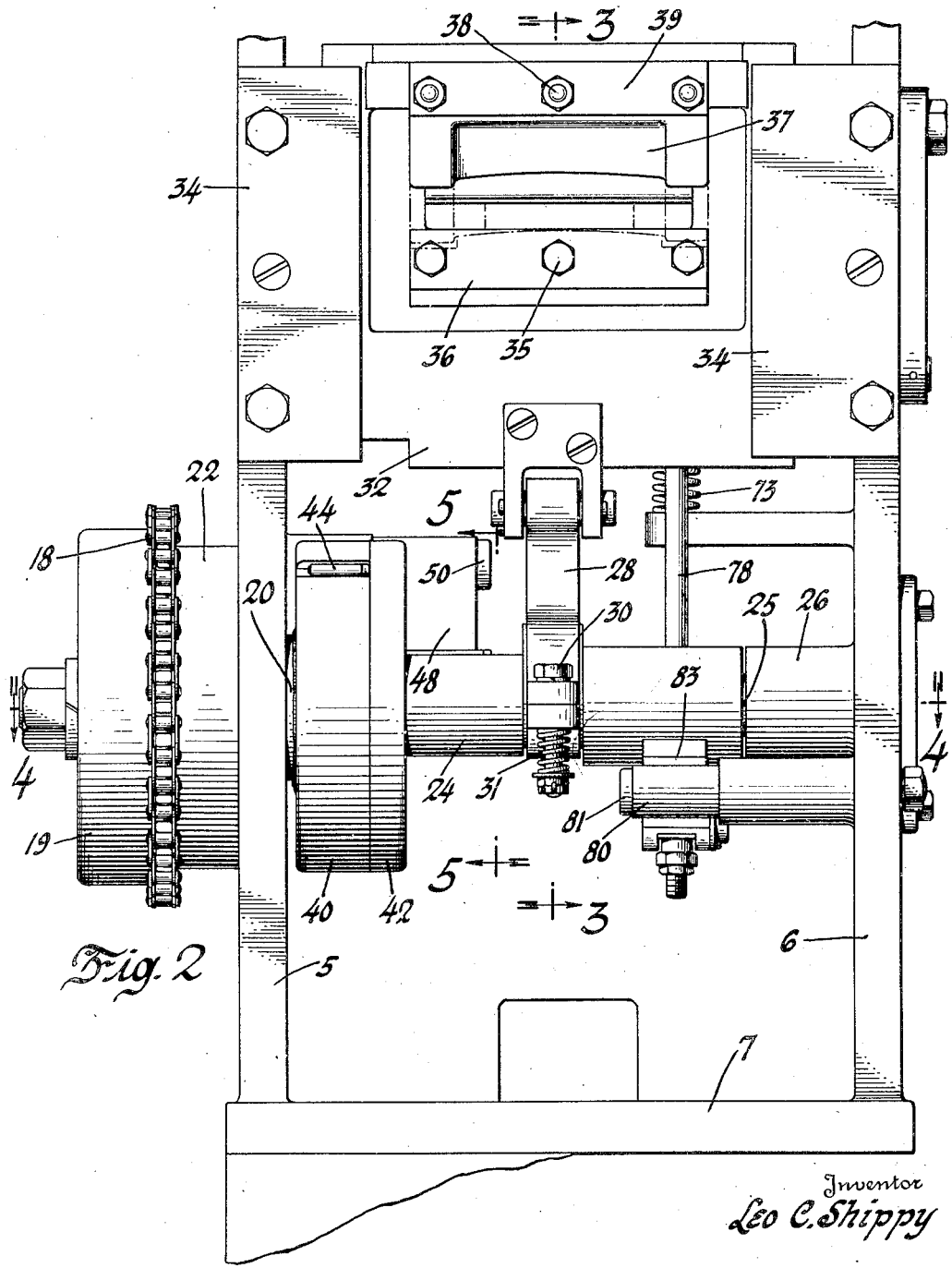
Figure 3:
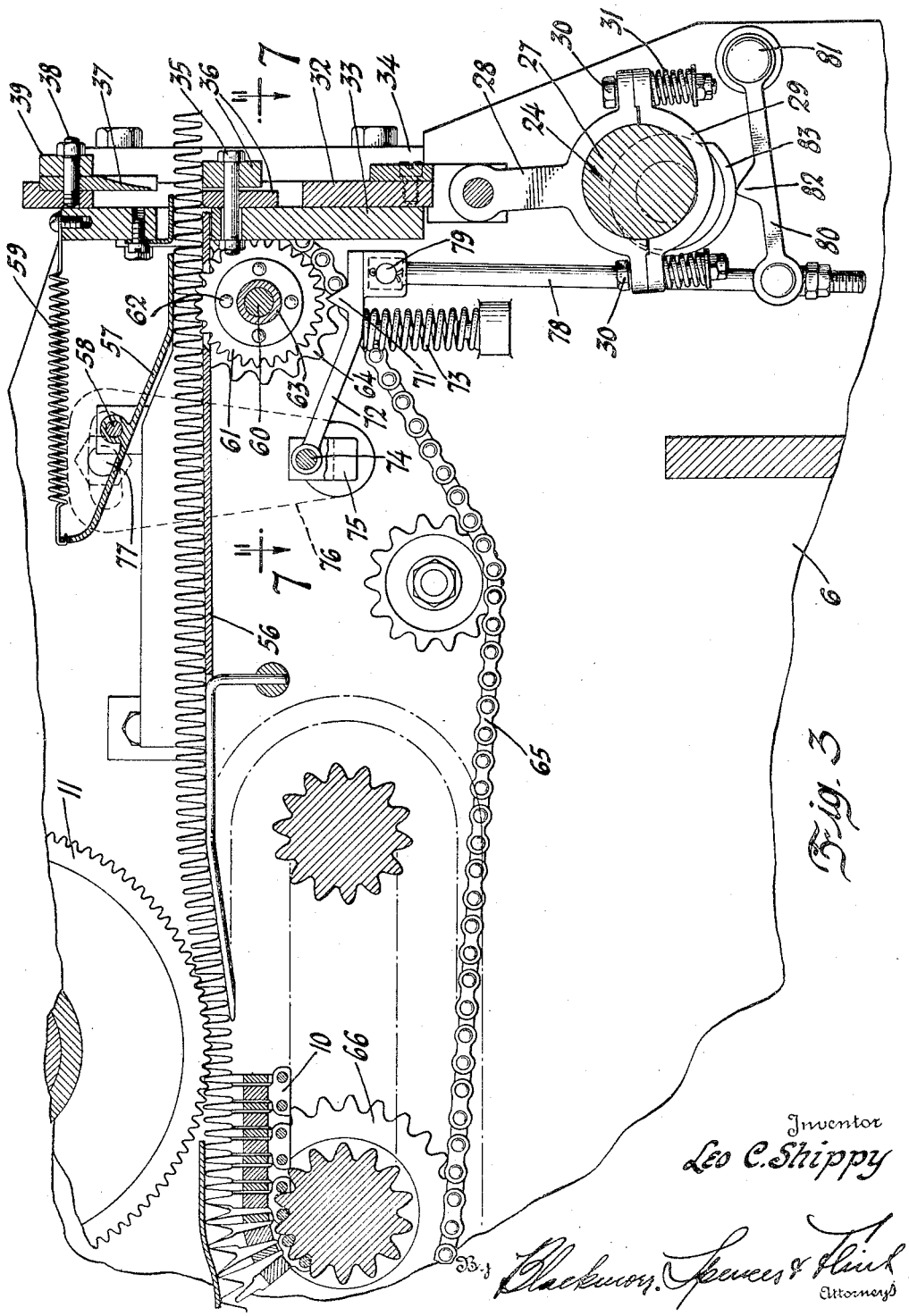
Figure 4:
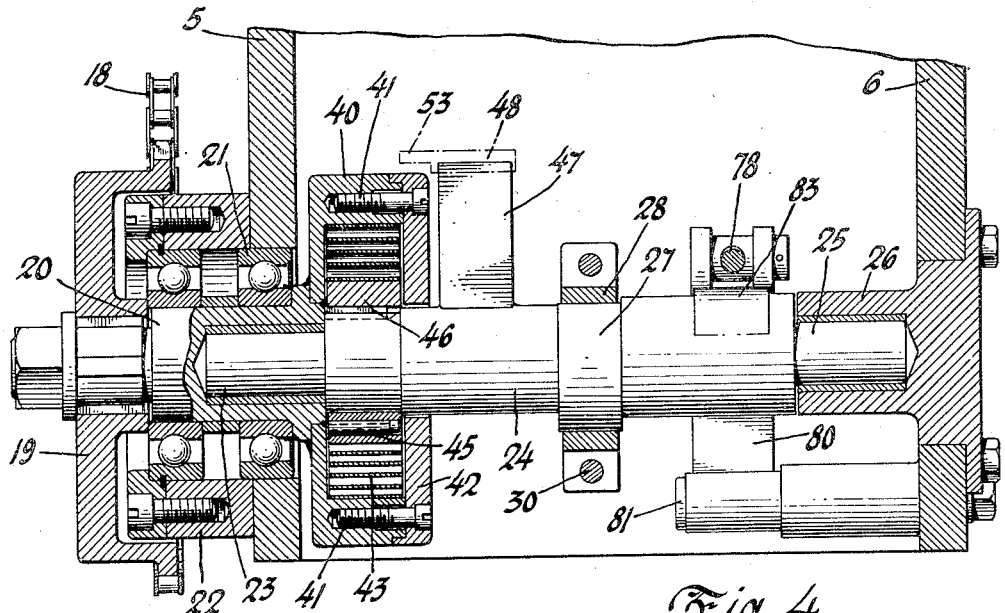
Figure 5:
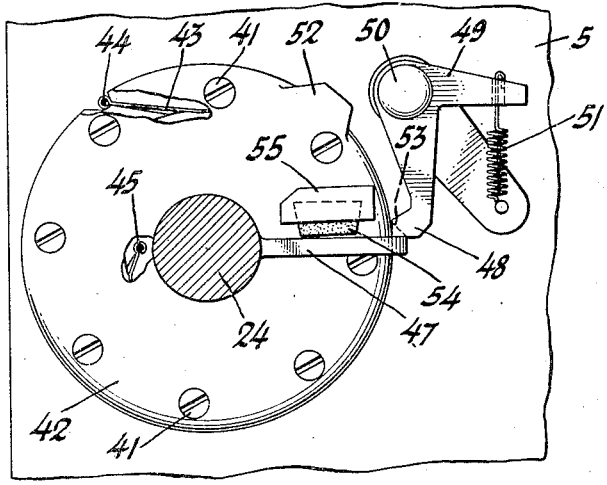
Figure 6:
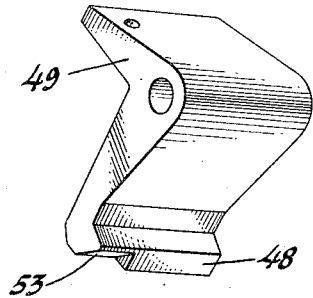
Figure 7:
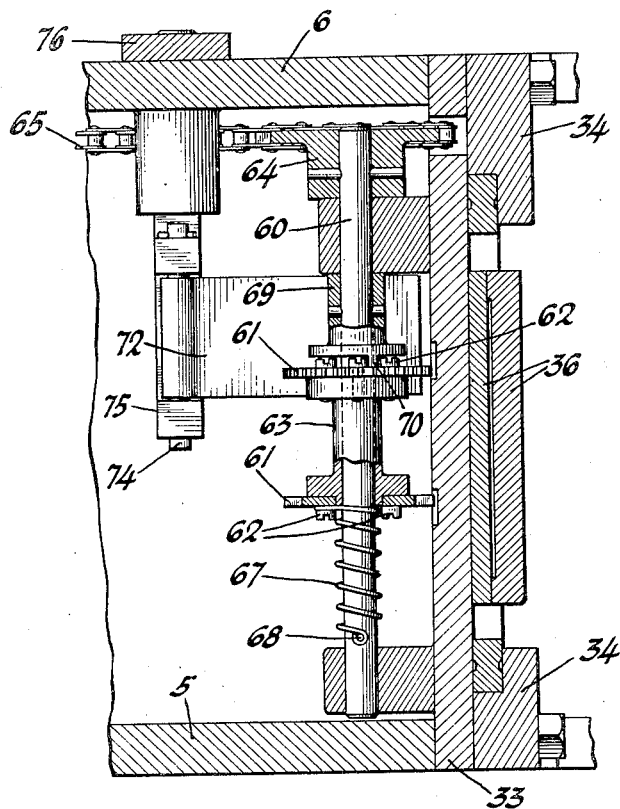

The objects and advantages of the invention will be best understood upon reference to the accompanying drawings illustrating a preferred embodiment, in which Figure 1 is a side elevation of the complete machine to illustrate more or less diagrammatically the relation of the various parts thereof; Figure 2 is an enlarged end elevation of the machine looking toward the left in Figure 1; Figure 3 is a longitudinal section of a part of the operating mechanism shown on a somewhat larger scale and is taken on line 3—3 of Figure 2; Figure 4 is a transverse section taken on line 4—4 of Figure 2; Figure 5 is a section through one of the operating shafts illustrating the trip mechanism forming a part of the drive for the shaft, and the view is taken on line 5—5 of Figure 2; Figure 6 is a detail perspective view of the pawl or stop shown in Figure 5; Figure 7 is a transverse sectional view taken on line 7—7 of Figure 3, and Figure 8 shows in perspective a small portion of the fin strip as it comes from the forming rolls.

Figure 8:
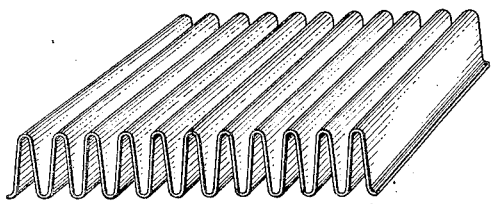

From an inspection of Figure 8 it will be at once apparent that the deeply corrugated strip will have little longitudinal stability but will yield to any slight force applied to it in any direction. The strip shown is a separator between adjacent water tubes and it provides in a radiator core, a series of heat radiating fins which divide the air space into a number of small cells. It is usually formed from brass or copper ribbon which is fed continuously at a uniform rate of speed between one or more sets of roll dies.

In Figure 1 a roll 1 of ribbon stock is shown at the front of the machine with the ribbon feeding through the machine to the rear or shearing end. Suitable forming rolls 3 and 4, mounted in side plates 5 and 6 extending upwardly from the bed plate 7, impart to the strip a preliminary zigzag form. From the preliminary rolls the strip passes to an endless or chain type forming die 8 which, in cooperation with a pressure roll 9 operating under somewhat slower speed than the preliminary forming rolls, reduces the space between the corrugations. A similar endless forming die 10 and companion roll 11 further crowd the fins together and impart to the strip its final zigzag shape.

Any suitable gear mechanism may be provided for driving the several forming dies in proper timed relation. Only so much of the gearing as will facilitate the understanding of the present invention is shown in the drawings. The main drive shaft is the one on which pinion 13 is mounted. Gear 12 is an idler on a swinging arm to connect pinion 13 with cut-off timing gear 16. Gear 16 is a change gear, and the number of teeth in it determine the number of convolutions that are in the strip cut-off. Gear 14, for the die member 10, is driven through the intermediate gear 15 from a gear not shown on the shaft on which gear 13 is mounted. Associated with cut-off timing gear 16 is a sprocket wheel 17 for the chain 18 for driving the sprocket 19.

The sprocket 19, as seen in Figure 4, is keyed or otherwise secured to a shaft section 20 mounted for rotation in bearings 21 supported in a cylindrical extension 22 on the side wall 5. The inner end of the shaft 20 is provided with a cylindrical recess in which is piloted a reduced end 23 of the driven shaft 24. The opposite end of the shaft 24 is also reduced as at 25 and journaled within a bearing plug 26 bolted to the opposite side wall 6 of the main frame. Intermediate its ends the shaft 24 is provided with the crank or eccentric 27 affording a bearing for the big end of the connecting rod 28, the cap 29 of which is yieldably connected by bolts 30 and springs 31 which yield to take up shock and prevent serious damage to the machine in the event of jamming. The connecting rod 28 operates a reciprocating slide 32 bearing against the end wall 33 of the machine and within a grooved way provided by guide blocks 34 suitably fastened to the end plate. The central part of the sliding plate 32 is provided with an enlarged opening in line with a smaller opening in the end wall 33 through which the formed stock passes. Secured by bolts 35 to the face of the end wall 33 and within the opening of the slide 32 are a pair of anvil plates 36 which provide between them a shearing edge for cooperation with the knife 37 clamped to the top of the slide by studs 38 and a clamping bar 39.

It will be obvious from Figure 3 that with each revolution of the shaft 24 the knife will be lowered to sever the formed strip lying on the anvil plates 36. In order to rotate the shaft 24 intermittently at regular intervals in relation to the action of the forming rolls an elastic coupling is provided between the shaft 24 and the sprocket wheel driven shaft section 20 together with a stop which holds the shafts against rotation in unison for the major part of the rotation of the driving element 20. For this purpose the inner end of the shaft section 20 has welded or otherwise secured thereto a hollow housing or drum 40 to which is secured by studs 41 a cover plate 42 and within which hollow housing is located a spirally wound spring 43 connected at opposite ends to the shaft 24 and housing, respectively. The connection between the outer end of the coil spring and the housing is illustrated at 44, while the connection between the inner convolution and the shaft 24 is illustrated at 45 where for convenience the shaft 24 is provided with an attaching collar 46 keyed thereon.

Referring more particularly to Figure 5, the shaft 24 is provided with a lateral or radial extension or lug 47 engaging at its end with a stop 48 provided on one leg of a bell crank lever or pawl 49 pivoted on a stud 50 carried by the side wall 5 of the frame. The other leg of the bell crank is engaged by one end of a tension spring 51 which serves to hold the pawl in engagement with the stop finger 47. The stop 48 is somewhat wider than the finger 47 and has a portion thereof overhanging the periphery of the continuously rotatable plate 42 which carries an outwardly extending lug 52 adapted to engage the cam face 53 of the pawl and thereby swing the pawl against the tension of the spring 51 to release the arm 47.

In operation the sprocket wheel 19 is driven at a uniform rate of speed and carries with it the shaft 20 and the spring housing formed by the drum 40 and end plate 42. Assuming the parts to be in the position shown in Figure 5 the shaft 24 will be held against movement whereby the spring 43 connected at opposite ends to the shaft and housing, respectively, will wind up and store energy until such time as the lug 52 engages the pawl and releases the arm 47. At this point in the cycle of operation the spring 43 will unwind and spin the shaft 24 to reciprocate the knife and shear off a portion of the formed strip. To cushion the inertia of the relatively moving parts, a rubber buffer 54 is carried by a lateral projection 55 on the end plate 42 for engagement with the stop arm 47.

In order to guide the formed strip from the roll to the knife, use is made of a track comprised in part of a flanged table 56 as shown in Figure 3, which extends into the opening in the end plate 33. Cooperating with the table is a hinged pressure plate 57 pivoted on the pin 58 and urged against the upper side of the formed strip by a tension spring 59 having one terminal hooked around the end of the pressure plate 57 and its opposite terminal secured by a set screw to any suitable part of the main frame.

Mounted on the transverse shaft 60 and projected upwardly through an opening in the guide table 56 is an indexing device comprising a pair of toothed wheels 61 fastened by screws 62 on the opposite ends of the hub 63 and adapted to engage by means of its teeth within the downwardly opening spaces between succeeding fins of the formed strip. The indexing wheel, therefore, locates the fin strip and passes a predetermined number of fins for controlling the length of the portions severed from the strip. For driving the indexing wheel in timed relation with the forming rolls, shaft 60 is provided at one end with a sprocket wheel 64 and is driven by a chain 65 from a gear 66 on the driving shaft for the endless forming die 10. To transmit the motion from the shaft to the indexing wheel use is made of a coil spring 67 secured at one end to a pin 68 carried by the shaft and at its opposite end secured by one of the fastening bolts 62 to the indexing wheel and hub assembly. To relieve the spring from overload the shaft has keyed thereto a spacer sleeve 69 from which projects a lug 70 to extend between an adjacent pair of fastening studs 62, there being sufficient space between the driving lug 70 and the studs to allow the necessary slight amount of lost motion.

The driving spring 67 is provided in order that there can be a certain amount of relative movement between the shaft and the indexing wheel and to give to the indexing mechanism a certain intermittent motion. In order to insure a clean cut upon operation of the knife, and because of the particular formation of the fin, it has been found desirable to temporarily stop or delay the feed during the descent of the knife. For this purpose there is provided a pawl or detent 71 on a lever 72, which pawl may be raised upwardly under the influence of a compression spring 73 to engage between the teeth of the index wheel 61. The spring 73 will yield to prevent injury in the event of jamming or any other failure of the operating mechanism. For the adjustment of the detent 71 with reference to the position of the indexing teeth the lever is pivoted at 74 on an adjustable bracket 75 which extends through the wall 6 of the machine and is provided with a slotted lever 76 adapted to be held in various positions by a clamping bolt 77. Normally the detent 71 is out of engagement with the indexing wheel and its operating spring 73 compressed by means of a connecting rod 78 pivoted at 79 to the end of the lever 72 and joining the same to a lever 80 pivoted at 81 below the operating shaft 24. The lever 80 is provided with a bearing lug 82 engaging with a cam element 83 on the shaft 24 and the relation of parts is such that when the shaft 24 is held stationary by the pawl 48 the indexing wheel stop 71 is out of engagement.

Upon rotation of the driven shaft 24, camming lug 83 allows the lever 80 to swing upwardly and under the influence of the spring 73 the detent 71 is moved into locking engagement with the indexing wheel for so much of the revolution of the driven shaft 24 as is necessary to complete the shearing operation. During this momentary interruption, the driving spring 67 will wind up, but immediately upon release of the indexing mechanism the spring will then move the index mechanism forward to compensate for the delay and in this manner avoid interference with the feed of the strip from the forming rolls. The indexing mechanism, therefore, has what might be termed a variable rate of speed inasmuch as its rotation is stopped to halt the feed during the cutting operation, is then speeded up under influence of the energy stored in the driving spring 67 and finally turns in unison with the continuously rotating shaft 60 until a given length of the strip has been fed past the knife for the next shearing operation.

From the above description it will be apparent that the mechanism provided will keep the stock moving smoothly from the crimping rolls without stretching or crowding and insure automatic shearing to precise length.

I claim:

1. A continuously operated machine for automatically forming strip stock and severing the formed strip into predetermined lengths, including a forming die acting on the strip at a uniform rate of speed, a shearing knife operated periodically in timed relation to said forming die, an indexing wheel engaging the formed strip, means mounting the indexing wheel for rotation about a fixed axis immediately adjacent the knife, and means to vary the speed of the indexing wheel to stop movement therebeyond of the formed strip during the shearing operation of the knife and thereafter accelerate the rate of movement so as not to interfere with the uniform rate of said forming die.

2. An automatic machine for shaping and cutting to length strip stock, including means operating continuously on the strip stock for forming the same at a uniform rate of speed, a rotary indexing wheel moving the formed strip to a cutter, means operated in relation to operation of the first mentioned means to delay periodically the rotation of said indexing wheel, other means to store driving energy during said delay for subsequent release to accelerate rotation of the indexing wheel in compensation for the delay, and means acting during said delay to cut the formed strip.

3. An automatic machine for shaping and cutting to length strip stock, including means operating continuously on the strip-stock for forming the same at a uniform rate of speed, means operated periodically in relation to the operation of the first mentioned means to cut the formed strip, and indexing mechanism feeding the formed strip in predetermined lengths to be cut and comprising relatively movable driving and driven elements, the driving element operating at a uniform rate in relation to the operation of the first mentioned means, means operated periodically in relation to said rate to hold the driven element against movement during the time the strip is being cut, and an elastic motion transmitting connection between said elements adapted to store the driving force while the driven element is held immovable for subsequent release.

4. In an automatic machine through which strip stock is fed continuously at a uniform rate of speed for working the same to given shape and size, a knife operated periodically in relation to the rate of feed for cutting the formed strip to length, an index wheel controlling the feed of the formed strip at the knife, means operated concurrently with knife operation to hold said wheel against rotation, a driving element for the wheel operating at a uniform speed and a spring connected at opposite ends to said element and the wheel for transmitting the drive therebetween.

5. In an automatic machine through which strip stock is fed continuously at a uniform rate of speed for working the same to given shape and size, a knife for cutting the formed strip to length, an index wheel controlling the feed to said knife and having a yieldable drive connection, a stop for said wheel and means simultaneously actuating said stop and said knife periodically in relation to said uniform rate of speed and including a driving element operating at a uniform rate, a shaft to be driven, having crank and connecting rod connections with the stop and knife respectively, an elastic motion transmitting connection comprising a spring connected at opposite ends to the shaft and said driving element, a pawl engaging the shaft to hold it against rotation and thereby wind the spring, and means operated by the driving element to trip said pawl after a predetermined degree of relative rotation for the rotation of the shaft under the influence of the force stored in said spring.

6. In a machine for forming strip stock and cutting the formed strip to length, forming means operated at a constant rate of speed, an intermittently operated knife, and means operating said knife and including a driving element operated at a uniform rate in relation to the rate of said forming means, a driven element controlling said knife, a spring connected at opposite ends to said elements, means to hold the driven element inoperative, and thereby wind said spring, and means active after a given relative movement of said elements to release said holding means for the actuation of the driven element through the spring.

7. In a strip forming machine, continuously rotating forming dies, a knife operated intermittently in timed relation to the rotation of the forming dies to sever the formed strip, an indexing wheel for feeding given lengths of formed strip to the knife, a stop active during the severing operation to hold said wheel stationary, wheel driving means operated continuously in timed relation to forming die rotation, and a resilient motion transmitting connection between said driving means and the wheel adapted during the action of said stop to store driving energy for subsequent release to move the wheel forward in compensation for the interruption of its movement with the wheel driving means.

8. In a strip forming machine, continuously rotating forming dies from which formed strip moves at a uniform rate of travel without interruption, an intermittently operating knife to sever the formed strip into given lengths, and an intermittently operable indexing wheel for continuous engagement with the formed strip to interrupt its travel at the knife and hold it stationary during the severing operation and in each interval between severing operations to feed to the knife a length of formed strip equivalent to that formed by the dies in their continuous rotation throughout the cycle of operation.

LEO C. SHIPPY.